June 26, 1934.   E. C. HORTON ET AL   1,964,400
MOTOR VEHICLE
Filed June 9, 1932   2 Sheets-Sheet 1

Inventors
Erwin C. Horton
George Dykstra
By Bean & Brooks. Attorney

June 26, 1934.　　　E. C. HORTON ET AL　　　1,964,400
MOTOR VEHICLE
Filed June 9, 1932　　2 Sheets-Sheet 2

Inventors
Erwin C. Horton
George Dykstra
By Bean & Brooks, Attorneys

Patented June 26, 1934

1,964,400

UNITED STATES PATENT OFFICE 1,964,400

MOTOR VEHICLE

Erwin C. Horton, Hamburg, and George Dykstra, Buffalo, N. Y., assignors to Trico Products Corporation, Buffalo, N. Y.

Application June 9, 1932, Serial No. 616,328

10 Claims. (Cl. 15—255)

This invention relates to a motor vehicle body construction and primarily to the embodiment of the windshield cleaner mechanism therein in a manner to preserve the stream line design of the modern automobile.

Windshield cleaners have quite generally been mounted with their driving motors at the upper edge of the windshield which not only subjected the windshield frame to this added weight but also disposed the windshield cleaner in the air stream which moves upwardly from the engine hood over the top of the car. The trend in the automotive field is toward the stream line design of body construction for reducing the air resistance to the travel of the car, and for this reason the overhanging visor has been eliminated from the windshield so that the windshield cleaner heretofore protected by the visor had its wiper blade and arm exposed to the air stream to be blown about on the windshield with the attendant chattering noise.

The present invention has for its object to provide a motor vehicle body construction in which the windshield cleaner is disposed adjacent the lower portion of the windshield, substantially without the air stream and in a manner such that the wiper element may be parked where it will be little affected by the air stream. Further it is the object of this invention to incorporate the windshield cleaner mechanism in the vehicle body proper and move the wiper back and forth on the windshield by power derived from a remote source and transmitted through a protected drive to a wiper operating shaft disposed in front of the lower edge of the windshield.

Figure 1:
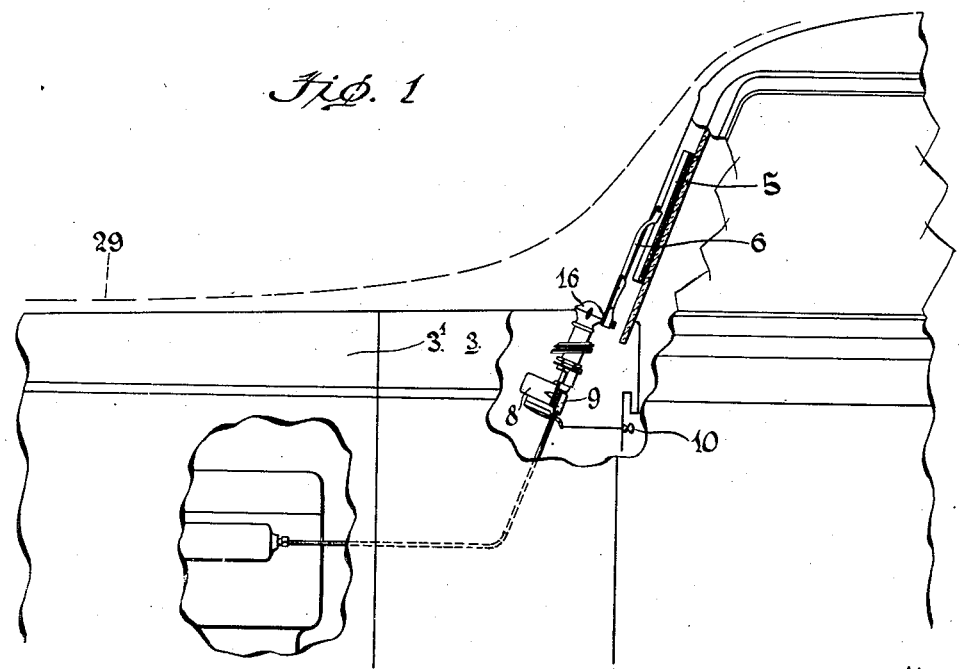
Fig. 1 is a view illustrating a motor vehicle embodying the present invention in one form.

Referring more particularly to the drawings, the numeral 1 designates the windshield depicted in a position inclining upwardly in a rearward direction in accordance with the stream line design of the vehicle. The windshield is preferably provided with a permanent mounting, against forward swinging. The lower edge of the windshield is mounted in a weather tight seat 2, and from the lower portion of the windshield extends the cowl 3 which may be provided with an upward apron extension 4, the engine hood 3' being included within the broad use of the term "cowl" as herein used.

The wiper element 5 is moved back and forth on the windshield by the arm 6 which is connected to the actuating shaft 7 and oscillated thereby. This shaft is disposed with its longitudinal axis substantially at a normal or perpendicular to the windshield 1 and derives its driving power from a remote source such as the windshield cleaner motor 8. The motor may be fluid operated and have its control valve 9 rendered accessible by the knob 10 on the depending panel or instrument board 11. The motor shaft 12 is connected to the transmission shaft 13 through a detachable interlocking coupling 12', said transmission shaft being herein illustrated as extending upwardly through an opening 14 in the cowl 3. The upper end of the transmission element 13 is geared to the shaft 7 by the beveled pinions 15.

The shaft 13 is journaled in a supporting housing 16, having journal support at 17 and also in the bushing 18 which is threaded in the lower end of the housing. The bearing 17 further may serve as a thrust support for the adjacent beveled pinion 15. This housing may be of simple form, such as a sleeve, and may be provided at its upper end with a gear chamber 19 for housing the beveled pinions 15 and further providing journal bearings 20 and 21 for the shaft 7. The shaft 7 projects at one end from the chamber 19 for connection with the wiper arm 6, and for simplicity in design and construction said shaft is journaled crosswise with respect to shaft 13, substantially at right angles thereto, so as to permit the use of 45° beveled pinions 15.

In order to dispose the wiper actuating shaft 7 substantially at a perpendicular or normal to the windshield the housing 16 is canted or inclined substantially in parallelism with the windshield, this being preferably accomplished by utilizing a pair of collars 22 and 23 having their opposing ends formed on a bias for seating on the cowl 3 in a manner to support the housing at the desired inclination. The housing 16 may be provided with a shoulder 24 to find support on the adjacent end of the collar 22 while the remote end of the collar 23 will find support on a nut 25 threaded on the downwardly projecting end of the housing 16 beneath the cowl 3. Bearing plates 26 and 27 are interposed between the biased ends of the collars 22 and 23 and the interposed cowl or body portion 3 so as to provide substantial support when the nut 25 is tightened to clamp the interposed cowl between said collars and thereby establish firm anchorage of the housing 16 on the body. Washers 28 of soft yielding material provide the desired weather proofing between the plates 26, 27 and the cowl.

Figure 2:
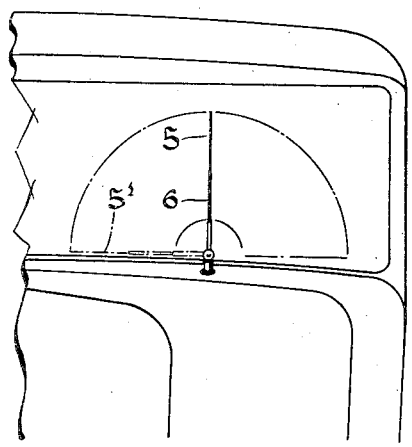
Fig. 2 is a front elevation of a portion of a motor vehicle more clearly disclosing the location of the windshield cleaner.
Figure 5:
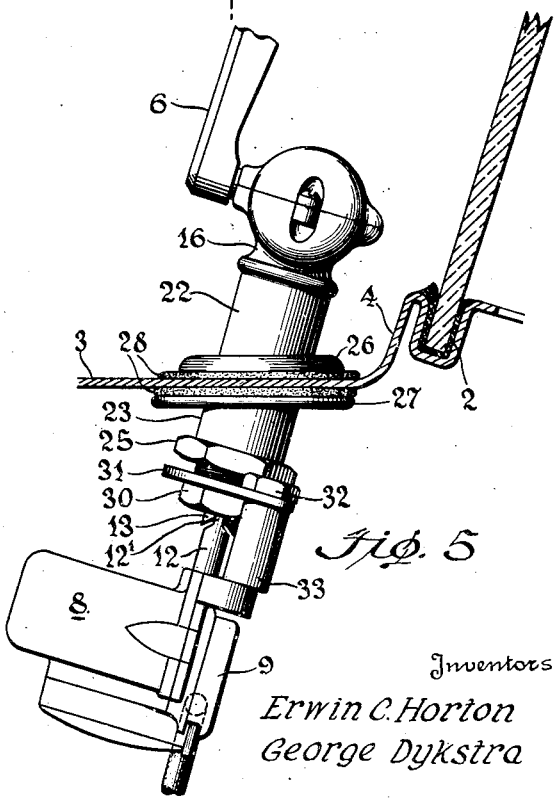
Fig. 5 is a view showing the windshield cleaner in a slightly different mounting over that depicted in Fig. 3.
Figure 4:
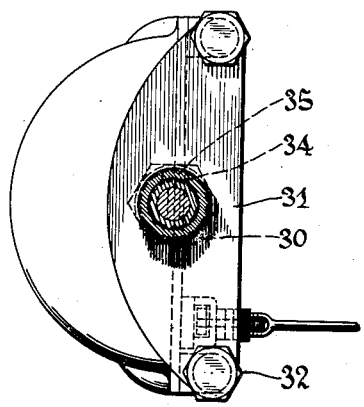
Fig. 4 is a sectional view taken about on line 4—4 of Fig. 3.
Figure 3:
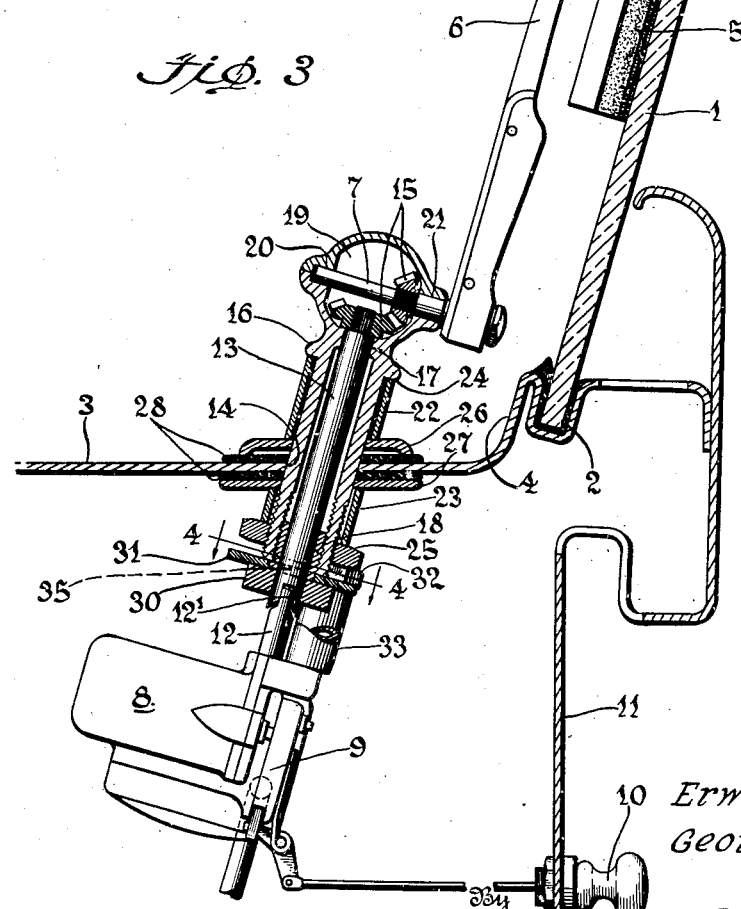
Fig. 3 is a fragmentary sectional view through the motor vehicle and windshield cleaner, more clearly disclosing the construction.

The biased clamping collars 22 and 23 complement each other and serve as simple means for properly positioning the housing 16 with respect to the windshield. The shaft 7 may project either rearwardly from the housing, toward the windshield, as illustrated in Fig. 3, or the housing may be turned about so that the shaft will project forwardly and away from the windshield as illustrated in Fig. 5, the wiper carrying arm 6 possessing the desired resiliency to yieldably hold the wiper 5 under proper pressure against the windshield. This disposes the projecting portions of the windshield cleaner close to the base of the windshield and substantially without the main body of the air stream which may be generally indicated by the broken line 29 in Fig. 1 and when the wiper is parked at one end of its stroke, as indicated at 5' in Fig. 2, it will be observed that the same is positioned within a comparative air pocket at the base of the windshield and well outside of the wind currents and therefore is not subjected to any violent action by the wind which might tend to cause the wiper to be lifted from the windshield when the vehicle is traveling at a high rate of speed.

The motor 8 is preferably supported by the housing 16 so as to provide a unitary support for the entire windshield mechanism, and facilitate the assembling and mounting of the parts thereof. In the particular form shown the bushing 18 is provided with a shoulder 30 by which a mounting plate 31 is clamped against the lower end of the housing sleeve 16, the plate being provided with end openings to receive the bolts 32 which after passing through the plate openings are engaged in the tubular brackets 33 carried by the windshield cleaner motor 8. When it is desired to demount the motor the bolts 32 may be removed to disengage the motor 8 from the plate 31 and thereafter the shaft 12 may be disconnected from the shaft 13. To hold the motor mounting plate against turning on the housing 16, the lower end of the latter is provided with a notch 34 to receive an inward projection 35 from the plate.

What is claimed is:

1. In a motor vehicle body construction including a windshield, a body portion extending forwardly therefrom and provided with an opening, a wiper element movable on the windshield, a wiper actuating shaft operatively connected to the wiper, a housing for the shaft supporting the same above the body portion, said housing being supported by the body portion adjacent the opening therein, drive means disposed beneath the body portion for operating the wiper actuating shaft, and transmission means extending through the body opening and operatively connecting said drive means to the wiper actuating shaft, said housing depending through the body opening and providing support for said transmission means above and below the body portion.

2. In a motor vehicle body construction including a windshield, a body portion extending forwardly therefrom and provided with an opening, a wiper element movable back and forth on the windshield, a wiper actuating shaft extending normal to the windshield and operatively connected to the wiper element, housing means supported by the body portion adjacent the opening therein and supporting the shaft above said body portion, a drive shaft disposed beneath the body portion for operating the wiper actuating shaft, means carried by said housing means for supporting said drive shaft, and transmission means extending through the body opening and operatively connecting said drive shaft to the wiper actuating shaft.

3. In a motor vehicle body construction including a rearwardly and upwardly inclining windshield, a cowl extending forwardly therefrom, a housing extending upwardly above the cowl and spaced from and in front of the windshield, said housing inclining rearwardly and terminating closer to the lower edge of the windshield to be substantially out of the air stream moving upwardly from the cowl over the windshield, a drive shaft extending from within the vehicle body into the housing, a wiper, a wiper actuating shaft connected to the wiper for oscillating the same and journalled in the housing, and means within the housing operatively connecting said drive shaft and said wiper actuating shaft, said wiper actuating shaft extending from the housing substantially normal to the windshield.

4. In a motor vehicle body construction including a windshield, a forwardly extending cowl provided with an opening, a wiper element movable back and forth on the windshield, a wiper actuating shaft operatively connected to the wiper element for actuating the same, housing means supporting the shaft above the cowl and in front of the windshield, drive means disposed beneath the cowl for operating the wiper actuating shaft, and transmission means extending through the cowl opening and operatively connecting said drive means to the wiper actuating shaft, said housing means having a sleeve part depending through the cowl opening and said transmission means including a shaft journaled in the housing means above and below the cowl and connected at its upper end to the actuating shaft and at its lower end to the drive means.

5. In a motor vehicle body construction including a windshield, a forwardly extending cowl provided with an opening, a wiper element, a wiper actuating shaft operatively connected to the wiper element for oscillating the wiper element on the windshield, means supporting the shaft above the cowl adjacent the opening therein and forwardly of the windshield, drive means disposed beneath the cowl for oscillating the wiper actuating shaft, and transmission means extending through the cowl opening and operatively connecting said drive means to the wiper actuating shaft, said shaft supporting means having a part depending through the cowl opening and providing support for said transmission means above and below the cowl.

6. In a motor vehicle having a rearwardly and upwardly slanting windshield and a forwardly extending cowl provided with an opening, a housing mounted adjacent the cowl opening and supported by the cowl, means mounting the housing on the cowl at an inclination thereto and in substantial parallelism with the windshield, a wiper movable on the windshield, a wiper actuating shaft connected to the wiper for actuating the same and journaled in the housing above the cowl substantially normal to the windshield, a drive disposed beneath the cowl, and transmission means between the drive and the wiper actuating shaft and extending upwardly through the cowl opening and into the housing, said wiper actuating shaft being disposed in proximity to the base of the windshield for parking the wiper near the base of the windshield and out of the air stream moving from the cowl upwardly over the windshield.

7. In a motor vehicle body construction having a rearwardly and upwardly slanting windshield and a forwardly extending cowl provided with an opening, a housing mounted adjacent the cowl opening and supported by the cowl at an inclination thereto and in substantial parallelism with the windshield, a wiper movable on the windshield, a wiper operating shaft connected to the wiper for actuating the same and journaled in the housing substantially normal to the windshield, a drive disposed within the body construction, transmission means between the drive and the wiper actuating shaft and extending through the cowl opening and into the housing, said housing being provided with a chamber into which said shaft extends, and gearing in the chamber connecting the shaft to said transmission means.

8. In a stream line motor vehicle having a windshield leaning rearwardly in an upward direction from the cowl whereby the air stream passing over the front of the vehicle and toward the windshield will provide an air pocket at the base of the windshield and over the adjacent cowl portion substantially without the main air stream, a wiper, a shaft connected to the wiper for actuating the wiper on the windshield in an upward arc extending more into the air stream, means supporting the shaft at a point in advance of the windshield substantially within the air pocket and permitting the wiper to be parked adjacent the lower edge of the windshield substantially without the main air stream, and means connected to the shaft for operating the shaft to actuate and park the wiper, said means being housed beneath the cowl, the cowl being closed against the weather and against the passage of an air stream into the pocket provided.

9. In a motor vehicle body construction including a windshield, a cowl extending forwardly therefrom and provided with an opening, a wiper actuating shaft, means supporting the shaft above the cowl with the shaft axis at a normal to the windshield, a drive arranged beneath the cowl, means suspending the drive from the cowl, and transmission means extending through the cowl opening and operatively connecting the drive to said wiper actuating shaft.

10. In a motor vehicle body construction including a windshield, a forwardly extending cowl provided with an opening, a wiper element movable back and forth on the windshield, a wiper actuating shaft operatively connected to the wiper element for actuating the same, housing means supporting the shaft above the cowl, said housing means being supported by the cowl adjacent the opening therein, drive means disposed beneath the cowl for operating the wiper actuating shaft, and transmission means extending through the cowl opening and operatively connecting said drive means to the wiper actuating shaft supported by the housing means.

ERWIN C. HORTON.
GEORGE DYKSTRA.